United States Patent
Marlow et al.

(10) Patent No.: US 6,886,439 B2
(45) Date of Patent: May 3, 2005

(54) PAPER ELIMINATION IN THE PRODUCTION OF BATTERY PLATES

(75) Inventors: John V. Marlow, Oakville (CA); Thomas Lester Oswald, Roseville, MN (US); Rajindra Singh, Oakville (CA); Albert M. Vincze, Oakville (CA)

(73) Assignee: Teck Cominco Metals Ltd., Vancouver (CA)

( * ) Notice: Subject to any disclaimer, the term of this patent is extended or adjusted under 35 U.S.C. 154(b) by 63 days.

(21) Appl. No.: 09/773,580

(22) Filed: Feb. 2, 2001

(65) Prior Publication Data

US 2002/0104412 A1 Aug. 8, 2002

(51) Int. Cl.⁷ .............................. B26D 7/10; B26D 1/56
(52) U.S. Cl. ................................ 83/171; 83/15; 83/346; 83/903; 83/922; 29/2; 29/6.1; 29/623.5; 141/1.1; 141/32
(58) Field of Search ........................ 83/922, 171, 15, 83/16, 343, 346, 903, 914; 428/597, 596; 414/800, 788; 141/1.1, 32; 164/1, 460, 476; 72/700, 199, 186, 187; 29/2, 879, 623.1, 623.5, 6.1, DIG. 49; 429/225, 246, 233, 231, 235; 427/126.3, 601, 133

(56) References Cited

U.S. PATENT DOCUMENTS

| | | | |
|---|---|---|---|
| 3,859,135 A | * | 1/1975 | Roberts et al. .............. 141/1.1 |
| 4,291,443 A | | 9/1981 | Laurie et al. |
| 4,297,866 A | | 11/1981 | Sakauye et al. |
| 4,315,356 A | | 2/1982 | Laurie et al. |
| 5,462,109 A | | 10/1995 | Vincze et al. |
| 5,669,754 A | | 9/1997 | Croteau et al. |
| 5,896,635 A | | 4/1999 | Marlow et al. |
| 5,948,566 A | * | 9/1999 | Larsen et al. ............... 429/225 |
| 6,180,286 B1 | * | 1/2001 | Rao et al. .................. 429/245 |
| 2002/0124388 A1 | * | 9/2002 | Chen et al. ................ 29/623.5 |

* cited by examiner

*Primary Examiner*—Boyer D. Ashley
(74) *Attorney, Agent, or Firm*—Arne I. Fors

(57) ABSTRACT

A method and apparatus for continuously producing pasted positive and negative electrode plates from pasted lead or lead alloy expanded, punched or cast metal mesh strip for use in lead-acid batteries without the use of paper barriers. The heating of cutting devices such as roll-mounted die-cutters to a predetermined temperature range of at least about 150° C., preferably about 160 to 300° C., and more preferably about 180 to 210° C., eliminates sticking of the paste on the pasted metal mesh strip to the cutting devices and obviates the need for the paper barriers.

4 Claims, 7 Drawing Sheets

PRIOR ART

PAPER ELIMINATION IN THE PRODUCTION OF BATTERY PLATES

BACKGROUND OF THE INVENTION (i) Field of the Invention

This invention relates to the continuous production of positive and negative electrode plates for use in lead-acid batteries, and more particularly, is directed to elimination of paper as barriers on both sides of pasted continuously expanded, punched or cast metal mesh strip during production of battery plates. Heretofore, such paper has been a standard requirement in the continuous production of battery plates in order to avoid the sticking of paste to the dies in the apparatus used to cut pasted metal mesh strip into battery plates.

(ii) Description of the Related Art

Conventional book mold cast plates for use in lead-acid batteries do not need a paper barrier because the individual plates do not require cutting after pasting. However, the continuous production of battery plates by the cutting of individual plates from rotary or reciprocated expanded mesh or cast mesh strip saturated with a paste necessitates the presence of a paper barrier on each side of the mesh strip to cover the paste.

U.S. Pat. No. 4,315,356 granted Feb. 16, 1982 to Cominco Ltd. discloses the production of expanded metal mesh from a coil of continuously cast metal alloys for use as battery plates. A slitting and expanding technique was developed for the continuous production of the expanded metal mesh from lead alloy strip cast by a drum caster. The expanded metal mesh was coated with a paste and the pasted mesh divided into discrete plates by a plate-cutter apparatus. Related technology is typified in U.S. Pat. No. 4,315,356 issued Feb. 16, 1982, U.S. Pat. No. 4,291,443 issued Sep. 29, 1981, U.S. Pat. No. 4,297,866 issued Nov. 3, 1981, U.S. Pat. No. 5,462,109 issued Oct. 31, 1995, and U.S. Pat. No. 5,896,635 issued Apr. 27, 1999 to Cominco Ltd., and in U.S. Pat. No. 5,669,754 issued Sep. 23, 1997 to Advanced Dynamics Corporation Ltd., all incorporated herein by reference.

The plate-cutter apparatus, also known as a divider or die-cutter, is an integral part of the continuous lead-acid battery manufacturing process and is well known in the art. The plate cutter is located immediately after the stage for application of paste to the lead mesh. Conventionally, a paper barrier is applied onto the paste on both sides of the lead or lead alloy mesh strip. This paste, without the application of a paper barrier thereto, would stick to the tooling of the plate cutter, quickly leading to improper cuts causing production downtimed. In addition, randomly deposited excess paste results in battery cell assembly problems. The use of these paper barriers adds significant material cost to the battery and creates numerous production problems. Paper tearing and paper release from plates cause major production line downtime. In addition, plates that are rejected during the production process, and recycled in the battery plant, can cause fires in plant bag houses because of the flammable paper overlay.

There have been many attempts to eliminate the presence of the paper barrier in continuous mesh cutting processes. For example, special die coatings and non-organic release agents have been tried, without success. The use of a paper overlay for battery plates began in the mid of 1970's and all efforts since then to eliminate its use have failed. As a result, the presence of a paper barrier has been a requisite in the continuous production of battery plates from strip and literally billions of battery plates have been produced and continue to be produced using the paper barrier system.

SUMMARY OF THE INVENTION

It is a principal object of the present invention to eliminate the need for paper as paper barriers in the continuous manufacture of battery plates. The elimination of paper from continuous production operations eliminates paper costs and obviates problems associated with its use, such as paper tearing, mistracking and paper roll changes, and attendant loss of valuable production time during downtime. Also, exhaust flue fires, due to paper separation from dry plates during battery assembly, are eliminated. Recycling costs of battery electrolytes, necessitated due to the presence of dissolved cellulose, are also reduced.

This invention is based on the application of heat to the cutting dies of a plate cutter, rotary or reciprocating, used in continuous lead-acid battery plate manufacturing processes. It has been found that the heating and maintaining of cutting dies at an elevated temperature ensures that paste does not come off the pasted lead mesh and does not adhere to the tooling. Such heating of the dies accordingly eliminates the need for paper barriers.

In its broad aspect, the method of the invention for cutting pasted expanded, punched or cast metal mesh strip into battery plates for lead acid batteries with a cutting device comprises heating said cutting device to a temperature above a predetermined minimum temperature at which the paste on the metal mesh strip adheres to the cutting device. The minimum temperature varies according to the composition of the paste and typically is at least about 150° C. The preferred temperature is in the temperature range of about 160to 300° C. more preferably about 180 to 210° C.

A preferred apparatus of the invention for continuously cutting pasted, expanded, punched or cast lead or lead alloy mesh strip into battery plates comprises a pair of opposed die rolls having cutting dies on at least one roll or reciprocating dies for cutting the pasted lead alloy mesh into equal lengths. The opposed die rolls have means for journalling said rolls in operative abutment with each other in a supporting frame, conveying means for continuously passing the pasted lead alloy mesh between the opposed rolls, and heating means for heating the cutting dies to a temperature above about 150° C. The heating means, such as electrical cartridge heaters, induction heaters, natural-gas fired heaters and heated circulating oil, are operative to heat the cutting dies to a temperature in the temperature range of about 160 to 300° C., preferably about 180 to 210° C. The preferred heating means are electrical cartridge heaters mounted axially in each of the rolls along the length of the rolls for uniformly heating the cutting die rolls.

The product of the invention is a paperless battery plate for use in lead-acid batteries and a lead-acid battery having a plurality of paperless battery plates.

BRIEF DESCRIPTION OF THE DRAWING

The method and apparatus of the invention will now be described with reference to the accompanying drawings, in which.

DESCRIPTION OF THE PREFERRED EMBODIMENT

Figure 1:
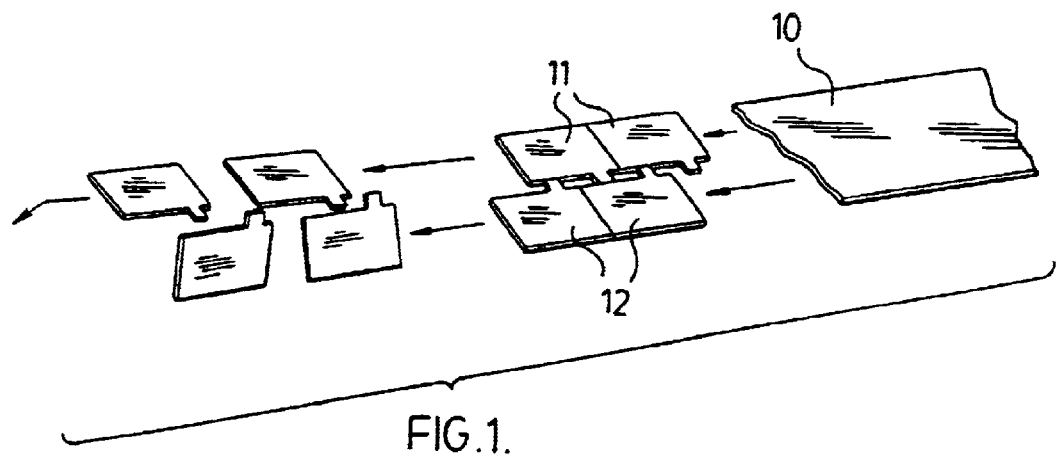
FIG. 1 is a schematic view illustrating the steps of dividing pasted expanded metal strip into battery plates.
Figure 2:
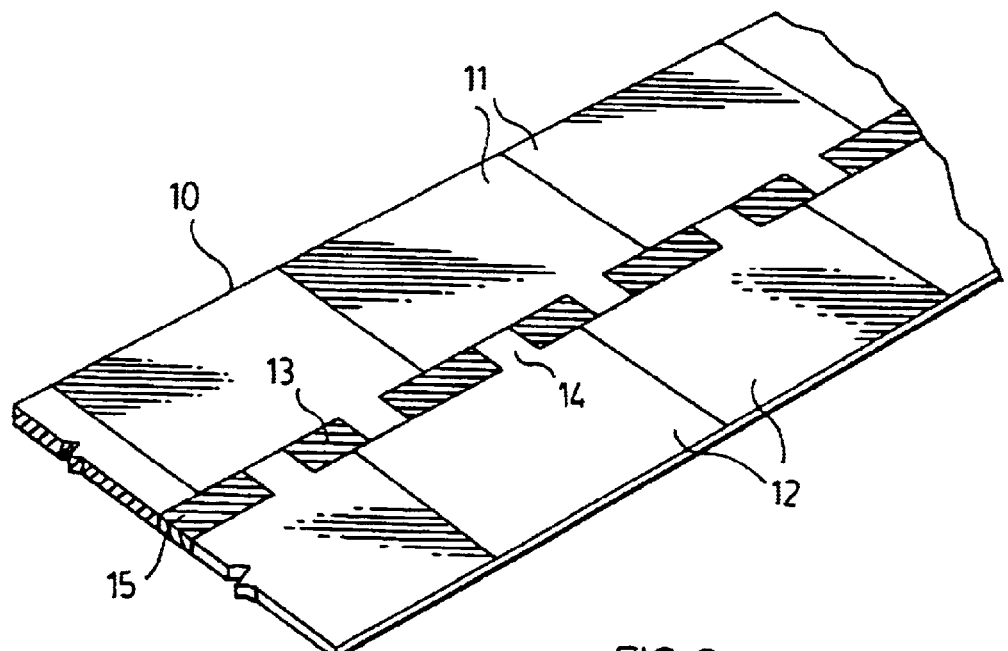
FIG. 2 is an enlarged fragmentary perspective view of pasted expanded metal strip showing plate cut lines.
Figure 3:
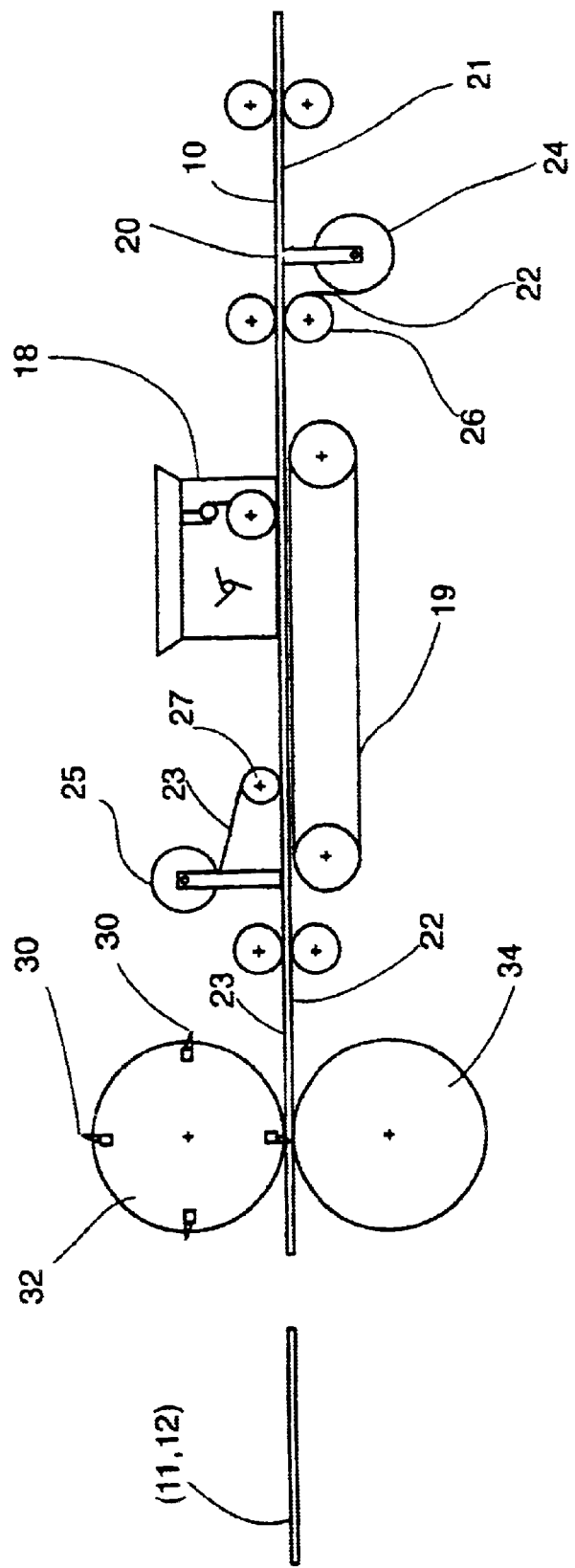
FIG. 3 is a schematic side elevation of a prior art plate-cutter in series with a conventional paster and paper applicator.

With reference to FIGS. 1–3, which show prior art, expanded metal mesh strip 10 produced from continuously cast strip from a molten metal alloy bath is shown cut into two opposed series of plates 11, 12 and advanced by a conveyor, not shown, to a collecting and stacking apparatus such as disclosed in U.S. Pat. No. 5,669,754. FIG. 2 illustrates in more detail plates 11, 12 with tabs 13, 14 extending inwardly. The mesh areas depicted by numerals 15 are discarded and recycled prior to pasting.

Turning to FIG. 3, expanded metal mesh strip 10 is shown supported under paster hopper 18 by endless support conveyor 19. Electrochemically active paste is applied to the expanded mesh strip to saturate the cavities in the mesh and to coat the sides 20, 21 of the mesh strip. The sides 20, 21 are covered with continuous paper barriers 22, 23 from paper rolls 24,25 passing over rolls 26,27. Paper barriers 22,23 obviate sticking of the paste to equispaced plate cutter dies 30 on cutter roll 32 during abutment of cutter dies 30 against anvil roll 34 to divide paper-covered, pasted metal mesh strip into plates 11, 12.

Figure 4:
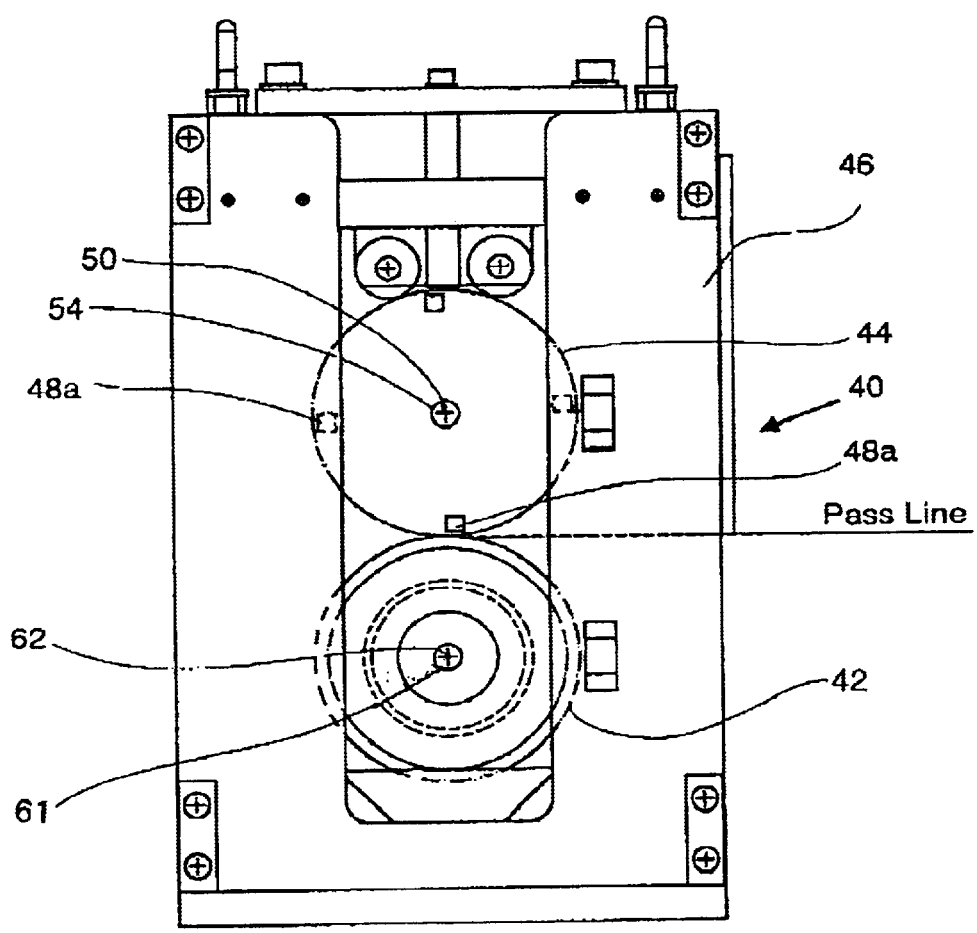
FIG. 4 is a side-elevation of an embodiment of heated rotary plate cutter of the present invention.
Figure 5:
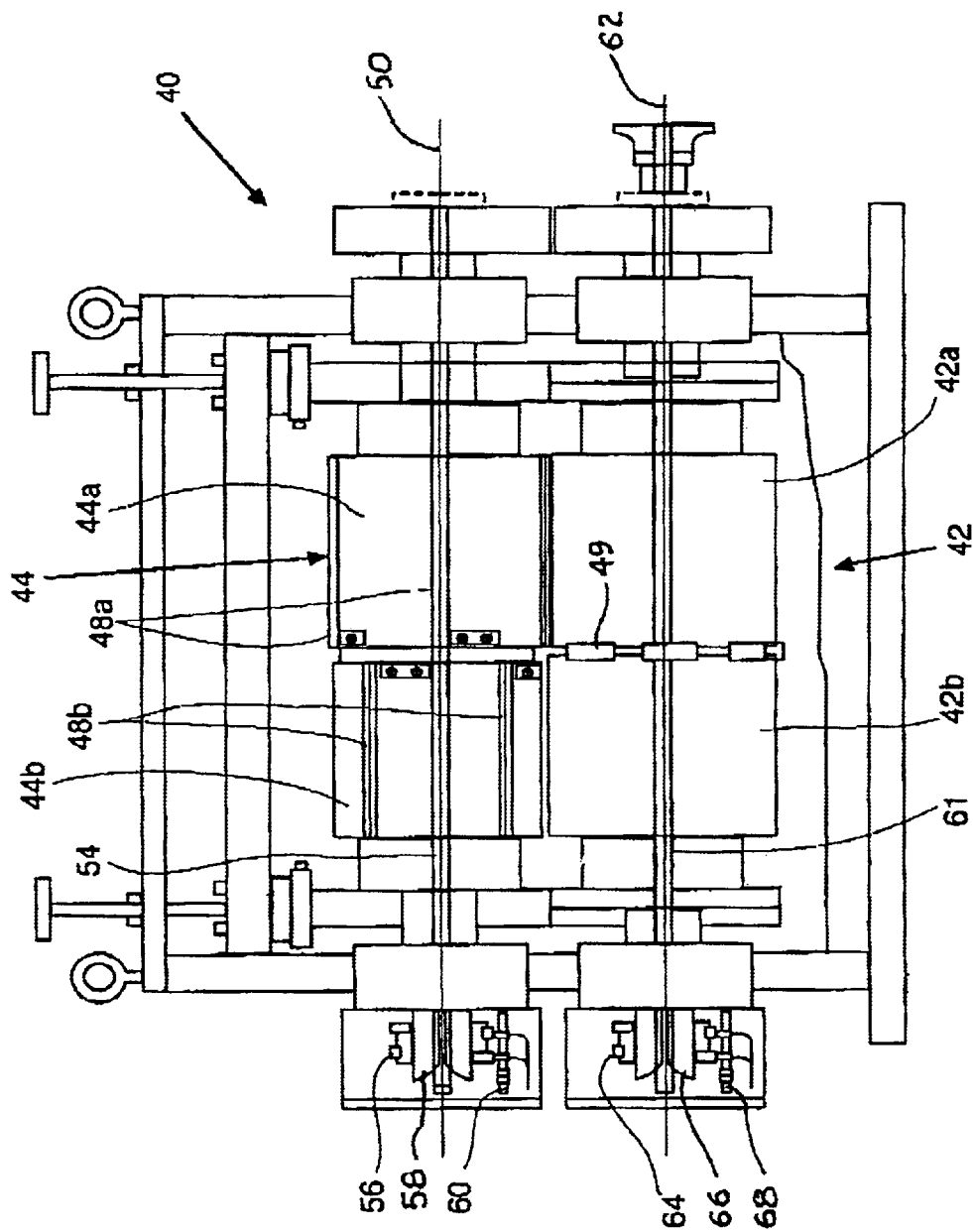
FIG. 5 is a front elevation of the plate cutter shown in FIG. 4.

FIGS. 4 and 5 illustrate an embodiment of plate cutter 40 of the invention having anvil roll 42 opposed to male die roll 44, both journalled for rotation in frame 46. Die roll 44 is divided axially into sections 44a and 44b having angularly equispaced die cutter blades 48a, 48b respectively mounted on the perimeters thereof parallel to the longitudinal axis 50 of roll 44 for severing paperless plates from pasted metal strip having the plate configuration shown in FIG. 2. Anvil roll 42 is divided axially into anvil roll portions 42a, 42b opposed to die roll portions 44a, 44b respectively.

With particular reference to FIG. 5, electrical cartridge heater 54 is mounted centrally in die roll 44 along the longitudinal axis 50 thereof in shaft 58 for heating the die roll 44 and the die cutter blades 48a, 48b. Slip ring 56 mounted on die cutter shaft 58 is in electrical communication through brush 60 to an electrical power supply to energize heater 54.

In like manner, anvil roll 42 has an electric cartridge heater 61 mounted centrally in the anvil roll along its longitudinal axis 62 in electrical communication with an electrical power supply through slip ring 64 mounted on anvil shaft 66 and brush 68 to energize heater 61 to heat the anvil roll 42.

Cartridge heaters 54, 61 are controlled by thermostats, not shown, to maintain the heaters in a temperature range of from at least 150° C. to above 300° C. in order to heat anvil rolls 42a, 42b, index ring 49, and die rolls 44a, 44b with die cutter blades 48a, 48b, to a temperature above about 150° C., preferably to a temperature in the range of about 160 to 300° C., more preferably about 180 to 210° C.

Figure 6:
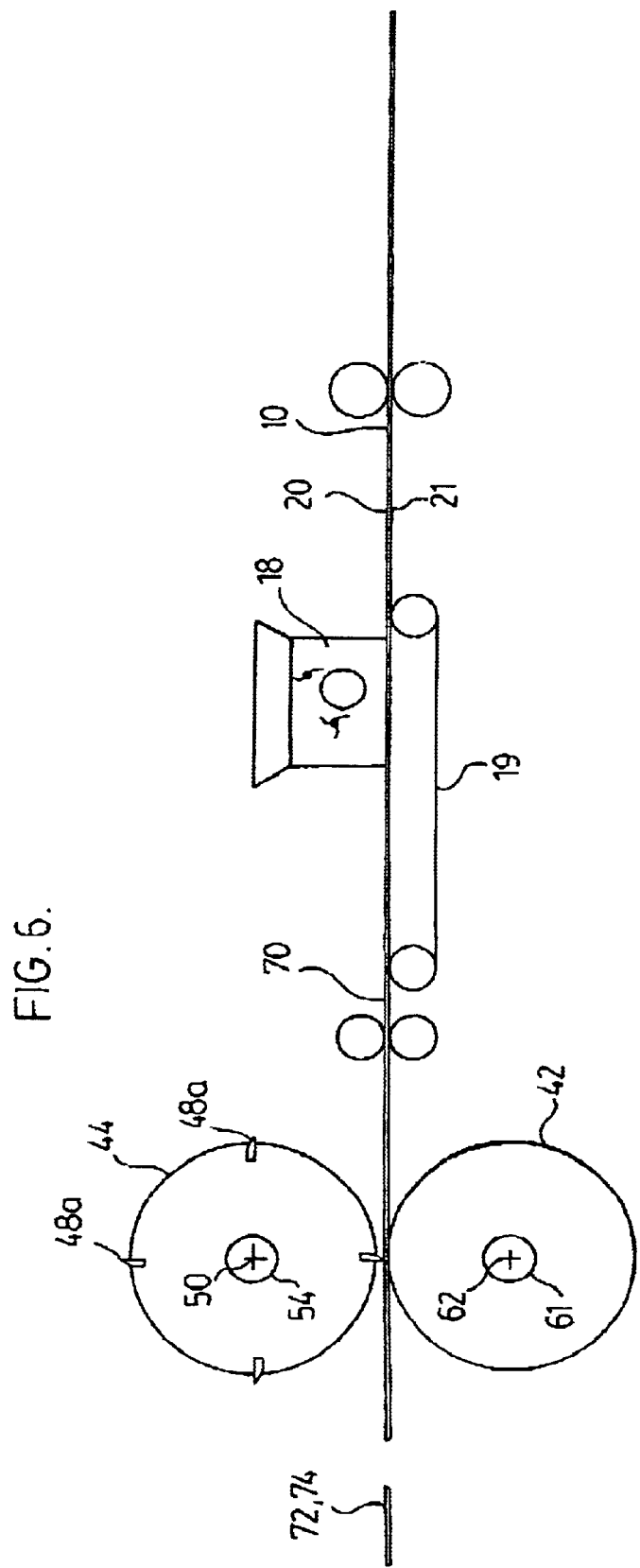
FIG. 6 is a schematic side elevation of the rotary plate-cutter of the invention in series with a conventional paster.

The method of the invention is shown in FIG. 6 in which expanded metal mesh strip 10 is shown supported under paster hopper 18 by endless support conveyor 19. Electrochemically active paste is applied to the expanded mesh strip 10 to saturate the cavities in the mesh and to coat the sides 20, 21 of the mesh strip. The pasted metal mesh strip 70 is passed between male die roll 44 and anvil roll 42 for severing the paperless pasted strip 70 by die cutter blades 48a and 48b (FIG. 5) into plates 72, 74 (FIG. 7) having the configuration of plates 11, 12 (FIGS. 1 and 2).

Figure 7:
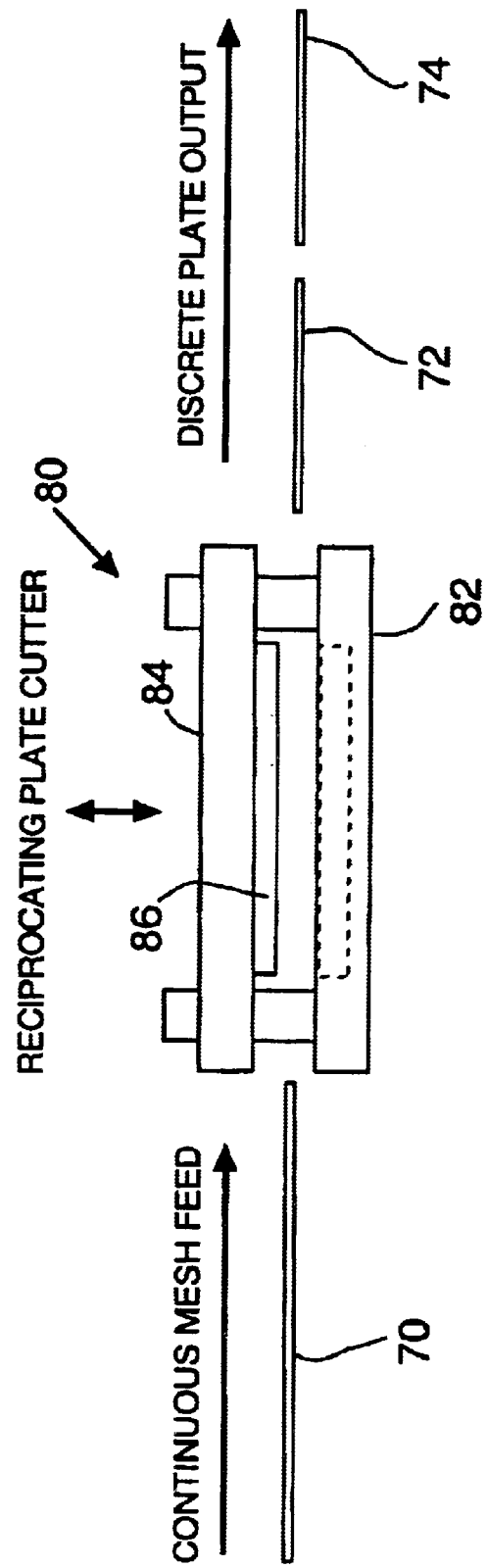
FIG. 7 is a schematic side elevation of a linear reciprocating cutter of the invention.

Although the description has proceeded with reference to a cutting device comprising an anvil roll opposed to a male die roll for severing expanded metal mesh strip, it will be understood that the cutting device may comprise a male die roll opposed to a female die roll or a linear reciprocating cutter for severing expanded, punched or cast metal mesh strip. FIG. 7 illustrates schematically a reciprocating plate cutter 80 having a stationary base 82 and a reciprocally movable platen 84 supporting cutting blade 86 for severing pasted mesh strip 70 into plates 72, 74 having the configuration of plates 11, 12 (FIGS. 1 and 2).

Figure 8:
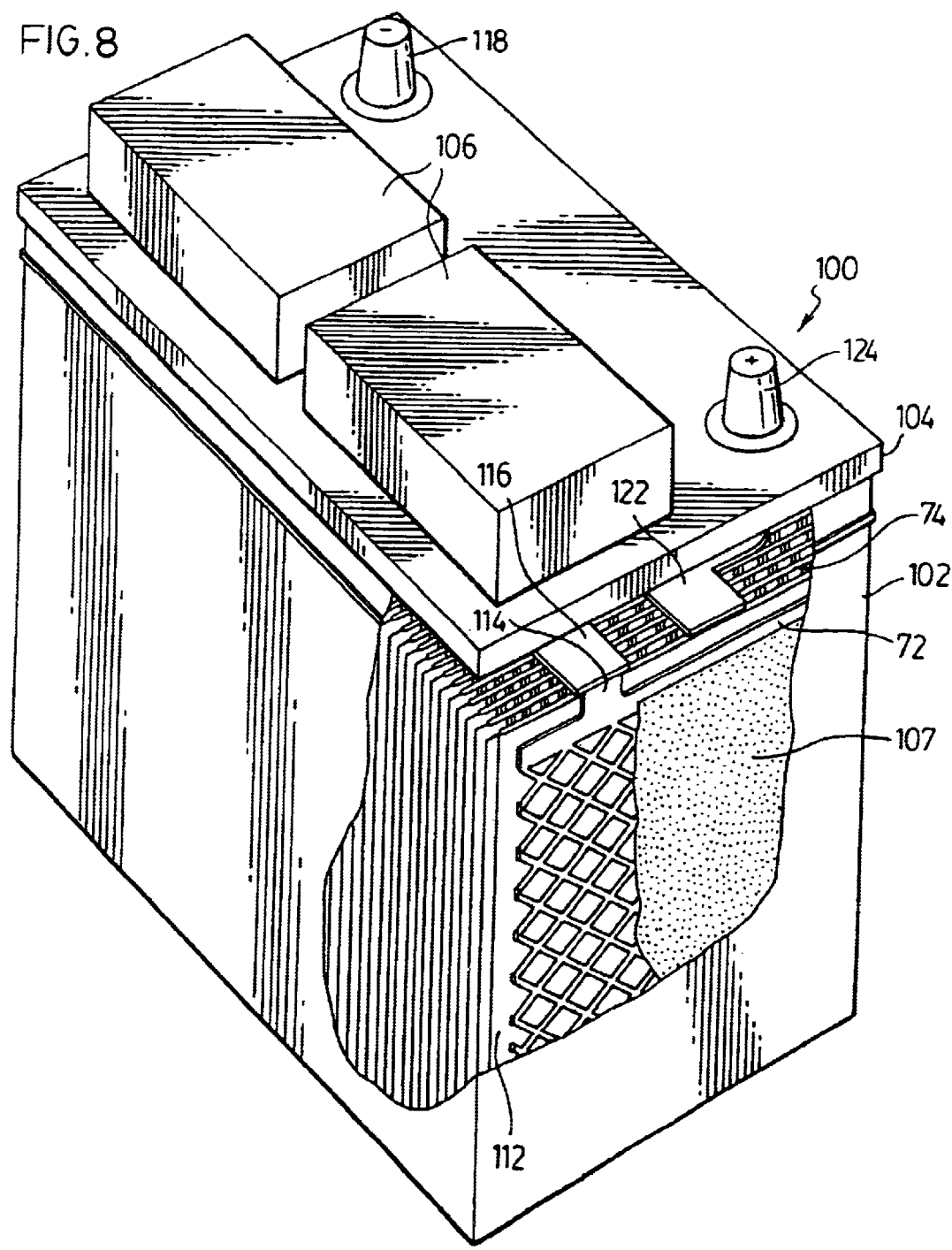
FIG. 8 is a perspective view, partly cut away, of a lead-acid battery assembly of the invention having paperless battery plates.

FIG. 8 illustrates a battery 100 having a plastic casing 102 with cover 104 including vent covers 106 containing the paperless battery electrode plates produced by the method of the invention. The plates including paste 107 are stacked vertically as negative plates 72 alternating with positive plates 74 separated from one another by plate separators 112. The grid tabs 114 of negative plates 72 are interconnected by metal header 116 to negative battery post 118 and the grid tabs (not shown) of positive plates 74 are interconnected by metal header 122 to positive battery post 124. Sulphuric acid solution, not shown, is added in an amount to submerge the battery plates for operating the battery.

EXAMPLE

Laboratory Trials

Experiments to test the method of the invention were initially carried out in laboratory trial, using a rolling mill. The rolls were operated at ambient room temperature and at various elevated temperatures. The mill was fitted with a pair of clamped-in-place cutting blades on the top roll for elevated-temperature cutting trials. All the tests conducted at the identified optimum temperature range performed flawlessly with no sticking of paste to the cutting blades, support roll or anvil roll. An experimental divider module was designed and fabricated. After a debugging period, successful no-sticking cutting performance was obtained. Six lengths of pasted mesh (each 20 feet long) were cut into battery plates (4½ inches wide by 5½ inches long), in a laboratory environment, with successful results; that is, the paste did not stick to the cutter die components.

It has been found for conventional battery paste for use on lead or lead alloy plates that the die temperature required to prevent sticking of battery paste to the dies must be above about 150° C. and below the melting point of the lead alloy of the battery plates, preferably to a temperature in the temperature range of about 160 to 300° C., more preferably about 180 to 210° C. Die temperatures in the temperature range between 80 to 150° C. are not effective, as battery paste will stick to the die surfaces. Temperatures above 300° C. are effective up to the melting point of the lead or lead alloy strip processed but are wasteful of heat energy, require greater compensation factors for thermal expansion of the apparatus and unduly reduce the life expectancy of the die support bearings. In addition, die temperatures in excess of about 210° C. present a possible safety hazard in that moisture in the paste can be vaporized and expelled rapidly by "paste spitting". However, it may be possible to operate above 210° C. to above 300° C. under certain operating conditions.

Plant Trials

The plate divider of the invention was trialed in an American battery plant that uses the Cominco™ Rotary Expander plate production line for routine production of automotive battery plates. The heated plate divider was installed in the line and test run on approximately 1300 feet of strip material or about 5000 negative plate electrodes. All process parameters of the line were typical of every day production with the exception that paper was not applied to the metal mesh. With the divider dies heated to a 190–200° C. temperature, there was no evidence of paste accumulation on the dies at the end of the trial run.

Although it will be understood that we are not bound by hypothetical considerations, it is believed the heating of the cutting device such as dies to a temperature in the preferred operative temperature range boils the moisture in the paste on the plates and generates steam locally at the dies to repel the paste from the dies, thus avoiding sticking or wetting of the dies by the paste. The wet pasted plate normally is in contact with the cutting apparatus for a short time, and if the line is temporarily stopped, rejects will result, necessitating removal.

The present invention provides a number of important advantages. Existing plate cutter devices in continuous processing lines can be replaced or retrofitted with heaters, eliminating the need for paper barriers to produce paperless pasted battery plates. Simplification of equipment and reduction of capital costs and maintenance result in immediate cost savings. No additional safety features or changes in operating conditions are required, other than observance of electrical safety standards, use of a fume hood, and selection of mechanical components such as appropriate bearings, with blade design and the like to compensate for thermal expansion. Operating parameters such as conventional processing speeds in the range of 0–200 ft/min of pasted mesh can be maintained or the speed readily adapted to various desired speed ranges.

It will be understood, of course, that modifications can be made in the embodiments of the invention described herein without departing from the scope and purview of the invention as defined by the appended claims.

What is claimed is:

1. A continuous method for cutting expanded, punched or cast continuous metal mesh strip freshly pasted with a polymer-free paste without the use of paper barriers to create paperless battery plates for use in lead acid batteries, the method comprising the steps of: providing a cutting device including a cutting roll having cutting blades mounted thereon, an index mechanism and an anvil roll opposed to said cutting roll for receiving the freshly pasted and paperless continuous metal mesh strip therebetween; and heating said cutting blades, the cutting roll, the index mechanism and the anvil roll to a temperature in the range of about 160 to 300° C. whereby the paste from the freshly pasted and paperless continuous metal mesh strip does not adhere to the heated cutting blades, the cutting roll, the index mechanism and the anvil roll during the cutting of the freshly pasted and paperless continuous metal mesh strip with said heated cutting device into discrete paperless battery plates.

2. A method as claimed in claim 1 in which the cutting blades, the cutting die roll, the index mechanism and the anvil roll are heated to a temperature in the range of about 180 to 210° C.

3. A method as claimed in claim 1 in which the cutting device is a linear reciprocating cutter.

4. A method as claimed in claim 1 in which the metal mesh strip is a lead or lead alloy expanded mesh strip.

* * * * *